(12) United States Patent
Zheng et al.

(10) Patent No.: US 11,587,252 B2
(45) Date of Patent: Feb. 21, 2023

(54) POSITIONING METHOD AND SYSTEM COMBINING MARK POINT POSITIONING AND INTELLIGENT REVERSE POSITIONING

(71) Applicant: ZG Technology Co., Ltd., Wuhan (CN)

(72) Inventors: Shunyi Zheng, Wuhan (CN); Xiaonan Wang, Wuhan (CN); Guanbao Ren, Wuhan (CN); Jianhua Cheng, Wuhan (CN)

(*) Notice: Subject to any disclaimer, the term of this patent is extended or adjusted under 35 U.S.C. 154(b) by 90 days.

(21) Appl. No.: 17/332,967

(22) Filed: May 27, 2021

(65) Prior Publication Data

US 2022/0207765 A1    Jun. 30, 2022

(30) Foreign Application Priority Data

Dec. 31, 2020  (CN) .......................... 2020116303033

(51) Int. Cl.
| | | |
|---|---|---|
| *G06K 9/00* | (2022.01) | |
| *G06T 7/73* | (2017.01) | |
| *G06T 7/80* | (2017.01) | |
| *G01B 11/25* | (2006.01) | |

(52) U.S. Cl.
CPC ............ *G06T 7/73* (2017.01); *G01B 11/2504* (2013.01); *G01B 11/2522* (2013.01); *G06T 7/85* (2017.01); *G06T 2207/30208* (2013.01)

(58) Field of Classification Search
CPC ... G06T 7/73; G06T 7/85; G06T 2207/30208; G06T 2207/10012; G06T 2207/10152; G06T 7/593; G06T 7/521; G01B 11/2504; G01B 11/2522; G01B 11/24; G01B 11/245
See application file for complete search history.

(56) References Cited

U.S. PATENT DOCUMENTS

| 9,710,972 B2* | 7/2017 | Sanders .................. H04N 5/275 |
| 11,417,328 B1* | 8/2022 | Katta ....................... G10L 15/08 |
| 2002/0091466 A1* | 7/2002 | Song ....................... A47L 9/009 |
| | | 701/23 |

(Continued)

FOREIGN PATENT DOCUMENTS

| CN | 101099673 A | 1/2008 |
| CN | 104123540 A | 10/2014 |
| CN | 110176035 A | 8/2019 |

*Primary Examiner* — Shervin K Nakhjavan

(57) ABSTRACT

A positioning device combining mark point positioning and intelligent reverse positioning and method thereof, comprising a binocular camera, a third camera, and a laser; the laser is used for emitting laser projection, the binocular camera is used for acquiring images with laser lines and reflective mark points on the surface of the scanned object, and the third camera is used for acquiring images with coding points and mark points in the peripheral environment; the method comprises the following steps of: S1. calibrating parameters of each camera under different scanning modes, and enabling the parameters of each camera to synchronously and correspondingly transform when the scanning modes are switched; S2. judging and switching the scanning mode into a mark point mode or an intelligent reverse tracking mode through the scanning scene. The two positioning modes are flexibly switched, and the use of a user is facilitated.

9 Claims, 6 Drawing Sheets

(56) References Cited

U.S. PATENT DOCUMENTS

| | | | | |
|---|---|---|---|---|
| 2011/0157373 | A1* | 6/2011 | Ye | G06T 7/85 |
| | | | | 348/187 |
| 2013/0050476 | A1* | 2/2013 | Shi | G01B 11/2545 |
| | | | | 348/139 |
| 2015/0185322 | A1* | 7/2015 | Haegermarck | G05D 1/0248 |
| | | | | 901/1 |
| 2015/0260474 | A1* | 9/2015 | Rublowsky | G09B 9/003 |
| | | | | 434/16 |
| 2016/0166333 | A1* | 6/2016 | Wang | A61B 34/10 |
| | | | | 600/476 |
| 2017/0219693 | A1* | 8/2017 | Choiniere | F41G 3/145 |
| 2018/0051982 | A1* | 2/2018 | Yin | G06T 7/596 |
| 2018/0151000 | A1* | 5/2018 | Liv | H04N 5/2224 |
| 2018/0180408 | A1* | 6/2018 | Du | G01B 11/25 |
| 2019/0066524 | A1* | 2/2019 | Zhang | H04N 13/239 |
| 2019/0088156 | A1* | 3/2019 | Choi | G09B 9/003 |
| 2019/0180150 | A1* | 6/2019 | Taylor | G06V 10/446 |
| 2019/0279428 | A1* | 9/2019 | Mack | G06T 7/90 |
| 2019/0392598 | A1* | 12/2019 | Liu | G06T 7/521 |
| 2020/0234495 | A1* | 7/2020 | Nakao | G06T 15/20 |
| 2020/0273199 | A1* | 8/2020 | Rohde | G06T 7/557 |
| 2021/0027479 | A1* | 1/2021 | Price | G06V 10/143 |
| 2021/0365026 | A1* | 11/2021 | Nam | G05D 1/024 |
| 2022/0207765 | A1* | 6/2022 | Zheng | G06T 7/85 |

* cited by examiner

POSITIONING METHOD AND SYSTEM COMBINING MARK POINT POSITIONING AND INTELLIGENT REVERSE POSITIONING

CROSS-REFERENCE TO RELATED APPLICATIONS

The application claims priority to Chinese patent application No. 202011630303.3, filed on Dec. 31, 2020, the entire contents of which are incorporated herein by reference.

TECHNICAL FIELD

The disclosure relates to the technical field of three-dimensional scanning, in particular to a positioning method and system combining mark point positioning and intelligent reverse positioning.

BACKGROUND

With the development of high-end intelligent manufacturing, various high-end intelligent manufacturing technologies are emerging. Traditional industrial measurement and detection technologies are difficult to meet the needs of intelligent manufacturing, so three-dimensional laser scanners have been developed. With the development of Industry 4.0 and high-end manufacturing, there is a higher demand for product quality, so there is also a higher demand for the measurement and testing of industrial products, that is, a new demand for three-dimensional laser scanners. The light weight, portability, real-time intelligent processing, good man-machine interaction and automation of the three-dimensional laser scanner need to be considered.

At present, the types of high-precision three-dimensional laser scanners in the market are mainly divided into several types: mark point tracking type three-dimensional scanning, optical tracking instrument combined with 3-D spherical scanner. The former mark point tracking scanning has high measurement precision, and the existing problems are as follows: a mark point needs to be pasted on the surface of an object, so that the flexibility is not high; the latter optical tracking instrument combines with the 3D spherical scanner to solve the problem that no mark point need to be pasted on the object surface, but the precision is reduced, meanwhile, the optical tracking instrument is needed, and the laser scanner is designed to be spherical, so that the tracker can track conveniently, the use complexity is high, and the precision is low compared with the stick point.

SUMMARY

Aiming at the technical problems in the prior art, the disclosure provides a positioning device and method combining mark point positioning and intelligent reverse positioning. The two positioning modes are flexibly switched, the problems that mark points need to be pasted on the surface of the scanned object and the flexibility is not high are solved, the use by a user is convenient, the precision is high, the use is simple and convenient, and the automation degree is high.

The disclosure has the beneficial effects that: the three-dimensional scanner disclosed by the disclosure combines the characteristics of intelligent reverse tracking type scanning and mark point tracking type three-dimensional scanning, the surface of an object can be scanned without pasting a mark point, the precision is higher than that of an optical tracking type three-dimensional scanner, a mixed mode of pasting a mark point and not pasting a mark point can be used, which is freely switched, multipurpose, high in speed and high in precision in scanning, is simple and convenient to use and high in automation degree.

DETAILED DESCRIPTION OF THE EMBODIMENTS

The principles and features of the present disclosure will now be described, by way of example only, with reference to the accompanying drawings, which are not intended to limit the scope of the disclosure.

Figure 1:
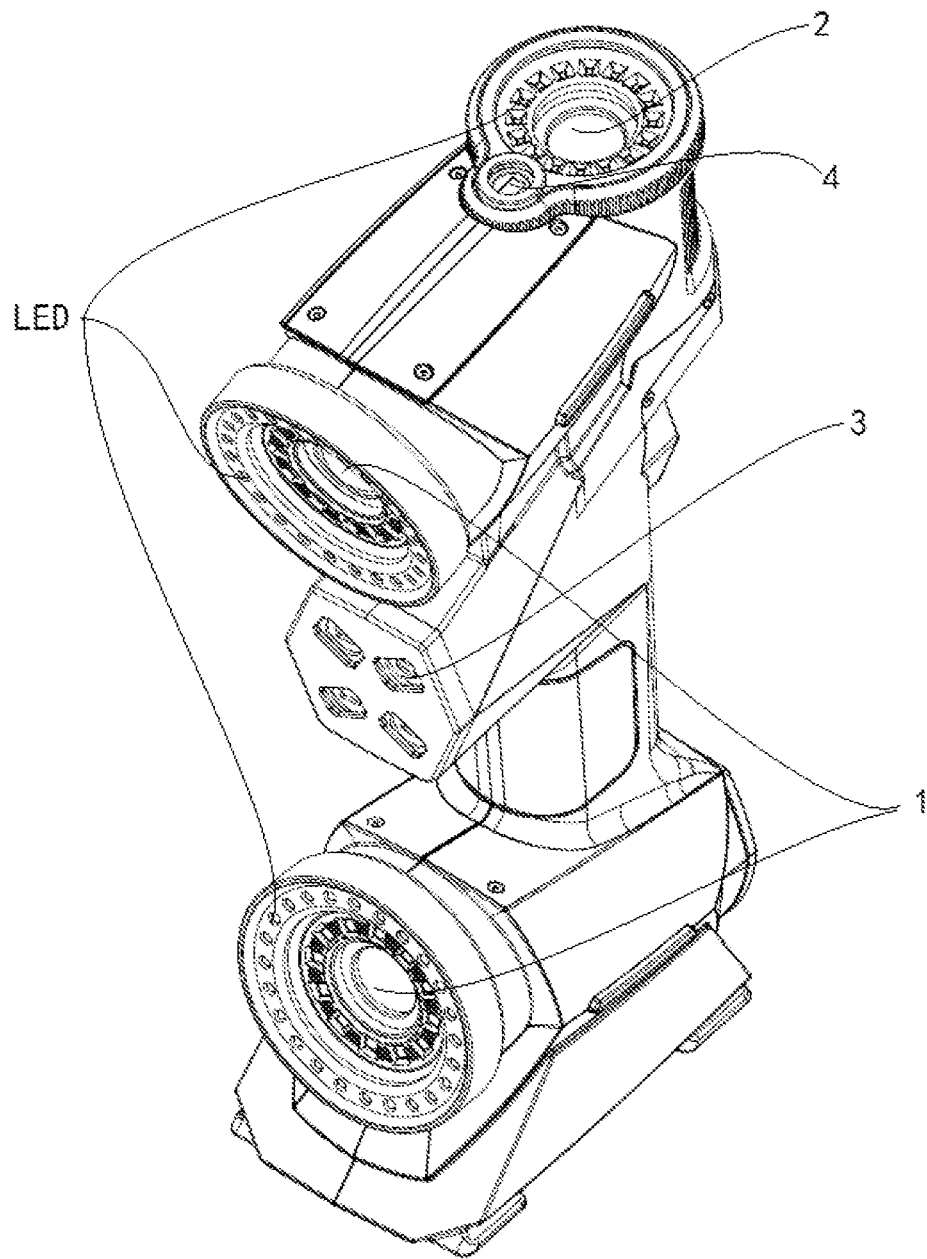
FIG. 1 is a schematic view showing the structure of the device of the present disclosure.
Figure 2:
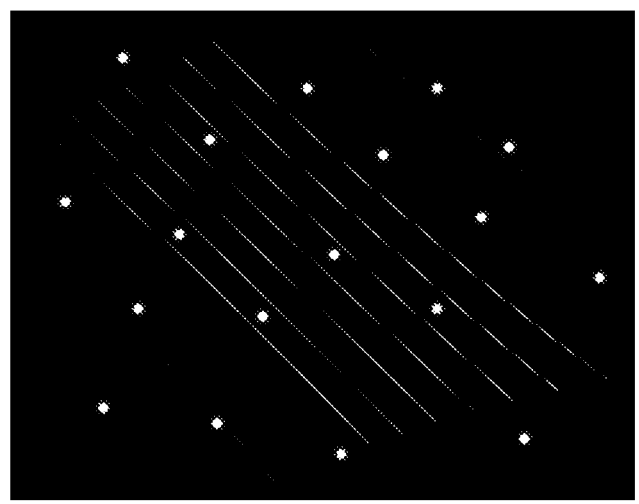
FIG. 2 is a schematic view of laser lines and reflective mark points in an image acquired in the present disclosure.

A positioning device combining mark point positioning and intelligent reverse positioning as shown in FIG. 1 is generally used as a three-dimensional scanner and comprises a binocular camera 1 and a third camera 2, wherein the visual field of the third camera 2 does not completely overlap with the visual field of the binocular camera 1, and in the embodiment, the lens of the third camera 2 is provided perpendicular to the lens of the binocular camera 1, so that the visual field of the third camera 2 is made non-overlapping with that of the binocular camera 1. The third camera 2 is further provided with a range indicator 4 for indicating a filming range of the third camera 2. A laser 3 is provided between the left camera and the right camera of the binocular camera 1, and the number of the lasers 3 can be flexibly adjusted according to actual requirements. As shown in FIG. 1, four lasers 3 are used in this embodiment. The binocular camera 1, the third camera 2 and the laser 3 are respectively in signal connection with an upper computer. The laser 3 is used for emitting laser projection, and the binocular camera 1 is used for acquiring an image of a scanned object 8, wherein the surface of the scanned object 8 is provided with laser lines and reflective mark points 6, and the image of the laser lines and the reflective mark points 6 is shown in FIG. 2. The third camera 2 is used for acquiring an image with a reflective coding point 5 and a reflecting marker point 6 in a peripheral environment, the upper computer controls the laser 3 to project laser lines on the surface of the scanned object 8, controls the binocular camera 1 and the third camera 2 to acquire images in the visual field, and the obtained images are processed by the upper computer. The upper computer calculates surface point cloud data of the scanned object 8 according to the images acquired by the binocular camera 1 and/or the third camera 2.

In the embodiment, LEDs are provided on the binocular camera 1 and the third camera 2, and a plurality of LEDs are provided on the periphery of each camera in an annular array. The LED emits light to provide a light source for reflecting light for reflective mark points 6, reflective coding points 5 sticked to the surface of the object 8 to be scanned and surrounding walls.

As shown in FIG. 1, the third camera 2 provided at the top of the device in the present embodiment uses high resolution, focuses around 2000 mm, satisfies photogrammetric conditions, and can clearly photograph reflective coding points 5 on surrounding walls so as to facilitate intelligent reverse tracking positioning. The front upper and lower cameras are binocular cameras 1, and the upper and lower cameras are respectively used as a left camera and a right camera of the binocular camera 1. Performing binocular vision processing on the binocular camera 1, and collecting laser line data through binocular vision in an intelligent reverse tracking mode to generate a real-time three-dimensional model; in the mark point mode, the binocular camera 1 performs tracking positioning through the reflective mark point 6 while collecting laser line data, thereby generating three-dimensional data. A plurality of lasers 3 are provided in the middle of the binocular camera 1 and emit laser light to be projected onto the surface of a scanned object 8 to form laser light projection to be captured by the binocular camera 1.

The device is used as a three-dimensional scanner and can perform three-dimensional scanning on an object to be measured through equipment or manual movement of the device. For example, the device is driven by an equipment for pitching movement, the surrounding wall 7 is provided with reflective coding points 5 and reflective marking points 6 according to a certain rule, and whether the reflective marking points 6 are sticked to the scanned object 8 or not is determined according to scanning requirements. When the three-dimensional scanner starts scanning by moving, e.g. pitching or rolling, the area of the reflective coding points 5 and the mark points 6 on the surrounding wall 7 within the visual field of the third camera 2 is called a transition area, e.g. as shown in FIG. 4. When the reflective coding point 5 and the mark point 6 are not recognized within the visual field of the third camera 2 in a normal scan, this area is referred to as a completely occluded area (it will be understood that the visual field of the third camera 2 is occluded), as shown for example in FIG. 3.

Based on the device, the embodiment also provides a positioning method combining mark point positioning and intelligent reverse positioning, which comprises the following steps of:

S1. calibrating parameters of each camera under different scanning modes, and enabling the parameters of each camera to synchronously and correspondingly transform when the scanning modes are switched;

S2. judging and switching the scanning mode into a mark point mode or an intelligent reverse tracking mode through the scanning scene.

Furthermore, in the step S2, the mark point mode is used for scanning, only the binocular camera 1 participates in the process of acquiring images, and the third camera 2 does not work. Step S2 comprises the following steps of:

acquiring an image with a laser line and a mark point 6 through a binocular camera 1, extracting laser line coordinate information and mark point 6 coordinate information in the image, calculating three-dimensional coordinates of the laser line through a space forward intersection algorithm and establishing a laser line point cloud, calculating three-dimensional coordinates of the mark point 6 through a space forward intersection algorithm, and establishing a mark point set, establishing a mark point coordinate system through the laser line point cloud and the mark point set, matching the information of the current frame and the mark point sets of all previous frame images to obtain a conversion relationship between the current frame and the previous frame images, converting the current frame images into the mark point coordinate system through the conversion relationship in sequence, and splicing to obtain the surface point cloud data of the scanned object 8 in the mark point coordinate system.

The mark point mode is used for scanning, and the detailed steps are as follows:

1. The reflective mark point 6 is pasted on the surface of the object, when the device scans, the left camera and the right camera of the binocular camera 1 collect a first frame image with laser lines and the reflective mark points 6 as shown in FIG. 2.

(1) The image point coordinates of the mark points 6 are identified and extracted, the three-dimensional coordinates of the mark points 6 are calculated through algorithms such as space forward intersection and the like, and a mark point set is established.

(2) The three-dimensional coordinates of the laser line, namely the three-dimensional coordinates of the surface of the object, are calculated by extracting the coordinates of the center point of the laser line of the image (the laser line is on the surface of the object), adopting algorithms such as space forward intersection and the like.

(3) The three-dimensional coordinates of the mark point 6 and the three-dimensional coordinates of the laser line are both in the "camera coordinate system of the left camera at the time of the first frame" and will be referred to as the "mark point coordinate system".

2. When the scanner moves and scans, a second frame of image is acquired through the left camera and the right camera, and the three-dimensional coordinates of the mark point and the three-dimensional coordinates of the laser line of the second frame of image are calculated in the same manner.

3. When the scanner acquires images, the frame rate of the camera is particularly high, so that repeated mark points 6 exist in adjacent first and second frame images (at least three points, and in principle, the more the repeated mark points 6 are, the higher the precision and reliability are, the embodiment takes four repeated mark points 6 as an example to explain in detail in order to ensure the higher precision and reliability); matching the three-dimensional coordinates of the mark points in the second frame with the three-dimensional coordinates of the mark points in the mark point set. Assuming that the three-dimensional coordinates of the four mark points of the first frame are represented by $(X_0^1, Y_0^1, Z_0^1)$, $(X_1^1, Y_1^1, Z_1^1)$, $(X_2^1, Y_2^1, Z_2^1)$, $(X_3^1, Y_3^1, Z_3^1)$ (superscript indicates the frame number, subscript indicates the point number of the mark point 6 in the current frame), the three-dimensional coordinates of the mark point 6 of the first frame are in the "mark point coordinate system", and the three-dimensional coordinates of the four mark points of the second frame are represented by $(X_0^2, Y_0^2, Z_0^2)$, $(X_1^2, Y_1^2, Z_1^2)$, $(X_2^2, Y_2^2, Z_2^2)$, $(X_3^2, Y_3^2, Z_3^2)$.

The conversion relation between "the camera coordinate system of the second frame left camera" and "the mark point coordinate system" is calculated through the following formula:

$$\begin{bmatrix} X_0^1 & X_1^1 & X_2^1 & X_3^1 \\ Y_0^1 & Y_1^1 & Y_2^1 & Y_3^1 \\ Z_0^1 & Z_1^1 & Z_2^1 & Z_3^1 \end{bmatrix} = R_{c\_m} \begin{bmatrix} X_0^2 & X_1^2 & X_2^2 & X_3^2 \\ Y_0^2 & Y_1^2 & Y_2^2 & Y_3^2 \\ Z_0^2 & Z_1^2 & Z_2^2 & Z_3^2 \end{bmatrix} + T_{c\_m},$$

wherein $$R_{c\_m} = \begin{bmatrix} a_{00} & a_{01} & a_{02} \\ a_{10} & a_{11} & a_{12} \\ a_{20} & a_{21} & a_{22} \end{bmatrix}$$

represents a rotation matrix and $$T_{c\_m} = \begin{bmatrix} t_1 \\ t_2 \\ t_3 \end{bmatrix}$$

represents a translation vector.

4. Converting the three-dimensional coordinate of the laser line generated by the second frame into "a mark point coordinate system" through the rotation matrix $R_{c\_m}$ and the translation vector $T_{c\_m}$ calculated in the third step to complete the splicing work of the three-dimensional point cloud. The conversion relationship is shown in the following formula:

$$P_m^2 = R_{c\_m} P_c^2 + T_{c\_m},$$

wherein:

$P_c^2$ representing coordinates of a laser line three-dimensional coordinate of a second frame in "a camera coordinate system of a left camera of the second frame";

$P_m^2$ representing coordinates of the three-dimensional coordinates of the laser line of the second frame converted to the "mark point coordinate system".

5. Converting the three-dimensional coordinates of the mark points generated in the second frame into a "mark point coordinate system" through the rotation matrix $R_{c\_m}$ and the translation vector $T_{c\_m}$ calculated in the third step, splicing with the three-dimensional coordinates of the mark points in the first frame, and expanding the mark point set.

6. After acquiring the third frame of image, the three-dimensional coordinates of the mark point and the three-dimensional coordinates of the laser line are calculated in the same manner. Repeating the above steps 3, 4 and 5, and so on until all three-dimensional coordinates are converted to "the mark point coordinate system" to complete point cloud splicing, namely obtaining surface point cloud data of the scanned object 8.

In the embodiment, in the step S2, the intelligent reverse tracking mode is adopted for scanning, and both the binocular camera 1 and the third camera 2 participate in the scanning process. Step S2 comprises the following steps of:

acquiring a three-dimensional coordinate of the third camera 2 in a left camera coordinate system, acquiring an image with a laser line through a binocular camera 1, extracting three-dimensional coordinate information of the laser line, and calculating the three-dimensional coordinate point of the laser line in the left camera coordinate system by adopting a space forward intersection algorithm; acquiring an image with a coding point 5 and a mark point 6 in a peripheral environment through the third camera 2, extracting coordinates of the mark point 6, and calculating coordinates of the mark point 6 in a third camera coordinate system through a rear space intersection algorithm, calculating the conversion relation between the left camera coordinate system and the third camera coordinate system through the three-dimensional coordinates of the left camera in the third camera coordinate system and the coordinates of the mark points 6 in the third camera coordinate system, the laser line three-dimensional coordinate points of each frame of image are converted from the left camera coordinate system to the third camera coordinate system through the conversion relation to complete splicing, and obtaining the surface point cloud of the scanned object 8 in the third camera coordinate system.

Mark points 6 are provided between adjacent coding points 5, and adjacent mark points 6 are provided equidistantly. Each coding point 5 contains a digital information. When the coordinates of the mark points 6 are extracted through the third camera 2, firstly, the numbers of the coding points 5 are identified, a rough third camera coordinate system is established, the mark points 6 between the coding points 5 are identified, and the coordinates of the mark points 6 in the third camera coordinate system are accurately identified. The density of the code points 5 and the mark points 6 can be adjusted according to scanning accuracy requirements.

The intelligent reverse tracking mode is adopted for scanning, and the detailed steps are as follows:

1. The device is factory calibrated to obtain the three-dimensional coordinates of the third camera 2 (shown in FIG. 1) in the "left camera coordinate system", represented by $(X_i^s, Y_i^s, Z_i^s)$ (where s represents the coordinates in the "left camera coordinate system", i=1, 2, 3 . . . 156).

2. When the device starts scanning, a laser 3 on the scanner is used for projecting a laser line on the surface of an object to be detected, a left camera and a right camera on the scanner of the device are matched to acquire a current frame of laser line image, image point coordinates of the laser line are extracted from the image, and three-dimensional coordinates of the laser line in "the camera coordinate system of the current frame of the left camera" are calculated through algorithms such as space forward intersection and the like.

3. At the same time of scanning, the top of the scanner acquires images of the reflective mark points 6 and the coding points 5 on the surrounding wall 7 at opportunity, then identifies and extracts image point coordinates of the reflective mark points 6, and calculates coordinates of the reflective mark points 6 in "a third camera coordinate system" through algorithms such as rear space intersection and the like. Expressed with $(X_i^t, Y_i^t, Z_i^t)$ (where t represents the coordinates in the "third camera coordinate system", i=1, 2, 3 . . . 156), at least four coordinates of the reflective mark point 6 are obtained. The calculation relationship is as follows:

$$\begin{bmatrix} X_0^t & X_1^t & X_2^t & X_3^t \\ Y_0^t & Y_1^t & Y_2^t & Y_3^t \\ Z_0^t & Z_1^t & Z_2^t & Z_3^t \end{bmatrix} = R_{c\_t} \begin{bmatrix} X_0^s & X_1^s & X_2^s & X_3^s \\ Y_0^s & Y_1^s & Y_2^s & Y_3^s \\ Z_0^s & Z_1^s & Z_2^s & Z_3^s \end{bmatrix} + T_{c\_t},$$

wherein $$R_{c\_t} = \begin{bmatrix} a_{00} & a_{01} & a_{02} \\ a_{10} & a_{11} & a_{12} \\ a_{20} & a_{21} & a_{22} \end{bmatrix}$$

represents a rotation matrix and $$T_{c\_t} = \begin{bmatrix} t_1 \\ t_2 \\ t_3 \end{bmatrix}$$

represents a translation vector.

After obtaining $R_{c\_t}$ and $T_{c\_t}$, a laser line three-dimensional coordinate point is converted from "a left camera coordinate system" to "a third camera coordinate system" through the following formula:

$$P_t^i = R_{c\_t} P_c^i + T_{c\_t},$$

wherein:

$P_c^i$ representing coordinates of a laser line three-dimensional coordinate of a current $i^{th}$ frame in "a camera coordinate system of a left camera of the current frame";

$P_t^i$ representing coordinates of the three-dimensional coordinates of the laser line of the current frame converted to the "third camera coordinate system".

5. Repeating the steps 2, 3 and 4, converting the three-dimensional coordinate of the laser line acquired by each frame of image of the scanner into "a third camera coordinate system", and splicing the point clouds until the scanning is finished.

The advantages and disadvantages of using the above two modes separately are as follows: a mark point mode needs to paste a mark point 6 on the surface of an object to be scanned so as to complete the splicing work of the point clouds, the operation is complicated, the time consumption is long, but an operator can hold the device to scan the scanned object 8 by hands, and the occlusion problem caused by the large volume of the scanned object is avoided; when the intelligent reverse tracking mode scans, a mark point 6 does not need to be sticked to the surface of an object 8 to be scanned, a coding point 5 and a mark point 6 are provided on a background wall 7 around the object 8 to be scanned, the point cloud splicing problem is completed through intelligent reverse tracking, the time consumption is low, the scanning efficiency is high, but the third camera 2 cannot track normally due to the large volume of the scanned object. The splicing work cannot be completed due to the fact that positioning cannot be carried out due to the problems of coding sheets occlusion and the like. Therefore, the scanning work of a large object can be well completed by combining the two scanning modes.

According to the embodiment, in the step S2, flexible switching between scanning modes can be carried out according to use requirements of users.

Figure 3:
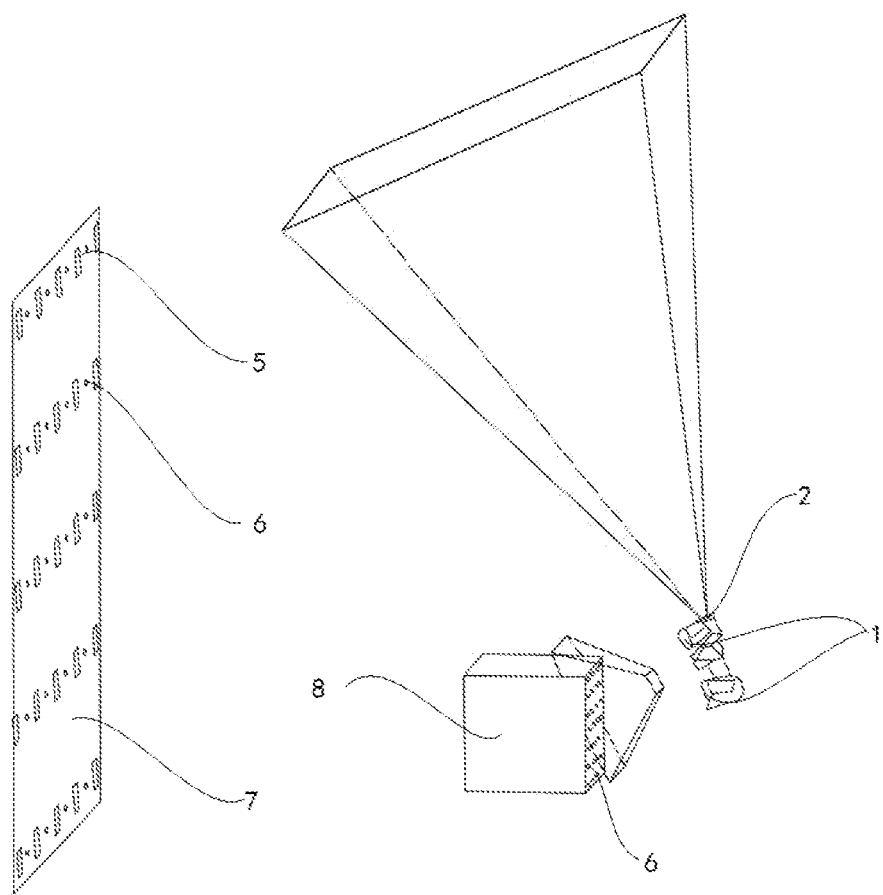
FIG. 3 is a schematic view of a completely occluded area of the present disclosure.
Figure 4:
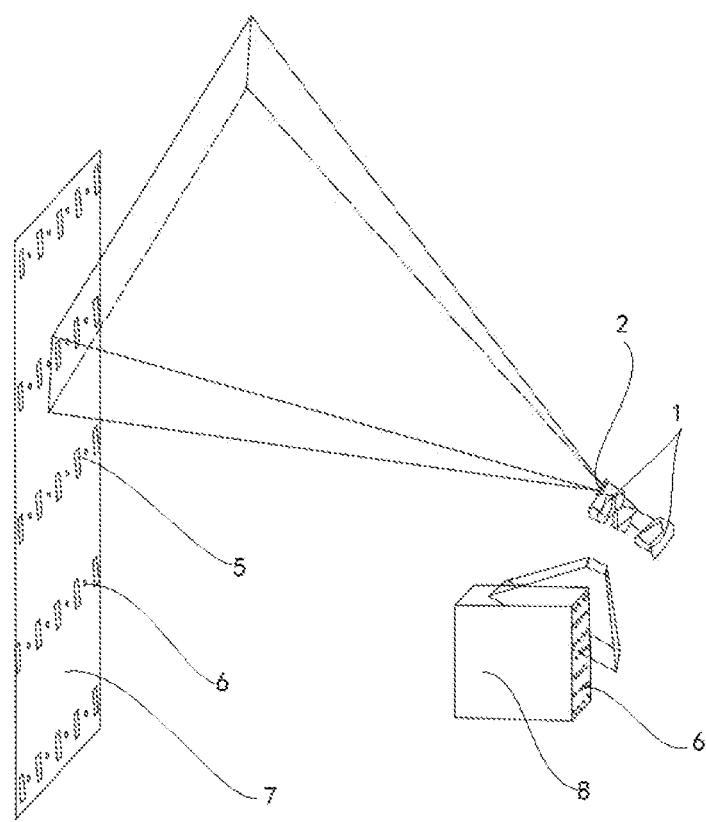
FIG. 4 is a schematic view of a transition area of the present disclosure.

The area before the visual field of the third camera 2 is completely occluded by the scanned object 8 is called a "transition area", that is, in the transition area, the third camera 2 can identify the coding point 5 and the marking point 6 on the surrounding wall 7; the area where the visual field of third camera 2 does not acquire the reflective coding points 5 and the mark points 6 on the surrounding wall 7 is referred to as a "completely occluded area", which may be the area where the third camera's line of sight is occluded by the scanned object 8, or the area where the third camera does not capture the reflective coding points 5 and the mark points 6 on the wall 7 due to the large rotation angle of the scanner, as shown in FIG. 3. The reflective coding point 5 and the mark point 6 on the wall 7 in the transition area is in the visual field of the third camera 2, and the scanned object 8 is pasted with the mark point 6, as shown in FIG. 4. The conversion relation between the "mark point coordinate system" and the "third camera coordinate system" can be calculated through multi-frame data in the transition area.

Switching from a mark point mode to an intelligent reverse tracking mode, comprising the following steps of:

in the transition area, calculating the conversion relation between the laser point cloud in the mark point coordinate system and the laser point cloud in the third camera coordinate system through the multi-frame image data, and converting the laser point cloud in the mark point coordinate system into the third camera coordinate system through the conversion relation.

The conversion relationship is calculated as follows:

the three-dimensional data coordinate $P_c$ of the laser line calculated by the current frame at a certain moment has the following conversion relation:

$$\begin{pmatrix} P_m = R_{c\_m} P_c + T_{c\_m} \\ P_t = R_{c\_t} P_c + T_{c\_t} \end{pmatrix} \Rightarrow P_t = R_{c\_t} R_{c\_m}^{-1} (P_m - T_{c\_m}) + T_{c\_t},$$

$$P_t = (R_{c\_t} R_{c\_m}^{-1}) P_m + (T_{c\_t} - R_{c\_t} R_{c\_m}^{-1} T_{c\_m}),$$

$$R_{m\_t} = R_{c\_t} R_{c\_m}^{-1}$$

$$\text{let, } T_{m\_t} = T_{c\_t} - R_{c\_t} R_{c\_m}^{-1} T_{c\_m}.$$

Wherein: the three-dimensional coordinate point which is converted into a third camera coordinate system from a mark point coordinate system has a rotation matrix of $R_{m\_t}$ and a translation vector of $T_{m\_t}$.

Switching from an intelligent reverse tracking mode to a mark point mode, comprising the following steps of:

in the transition area, calculating the conversion relation between the laser point cloud in the third camera coordinate system and the laser point cloud in the mark point coordinate system through the multi-frame image data, and converting the laser point cloud in the third camera coordinate system into the mark point coordinate system through the conversion relation.

The conversion relationship is calculated as follows:

the three-dimensional data coordinate $P_c$ of the laser line calculated by the current frame at a certain moment has the following conversion relation.

$$\begin{pmatrix} P_m = R_{c\_m} P_c + T_{c\_m} \\ P_t = R_{c\_t} P_c + T_{c\_t} \end{pmatrix} \Rightarrow P_m = (R_{c\_m} R_{c\_t}^{-1}) P_t + (T_{c\_m} - R_{c\_m} R_{c\_t}^{-1} T_{c\_t}),$$

$$R_{t\_m} = R_{c\_m} R_{c\_t}^{-1}$$

$$\text{let, } T_{t\_m} = T_{c\_m} - R_{c\_m} R_{c\_t}^{-1} T_{c\_t}.$$

Wherein: the three-dimensional coordinate point which is converted into "a mark point coordinate system" from "a third camera coordinate system" has a rotation matrix of $R_{t\_m}$ and a translation vector of $T_{t\_m}$.

In the process of scanning mode conversion, it is necessary to ensure that the relative positions of the "third camera coordinate system" and the "mark point coordinate system" do not change during the whole scanning process, i.e., the relative positions of the scanner device and the scanned object 8 to which the mark point 6 is pasted do not change. If the relative position changes, the conversion relationship between the "third camera coordinate system" and the "mark point coordinate system", i.e., the conversion relationship between the two modes, needs to be recalculated.

The scan mode conversion process will now be described in more detail in an application case.

Example 1

Figure 5:
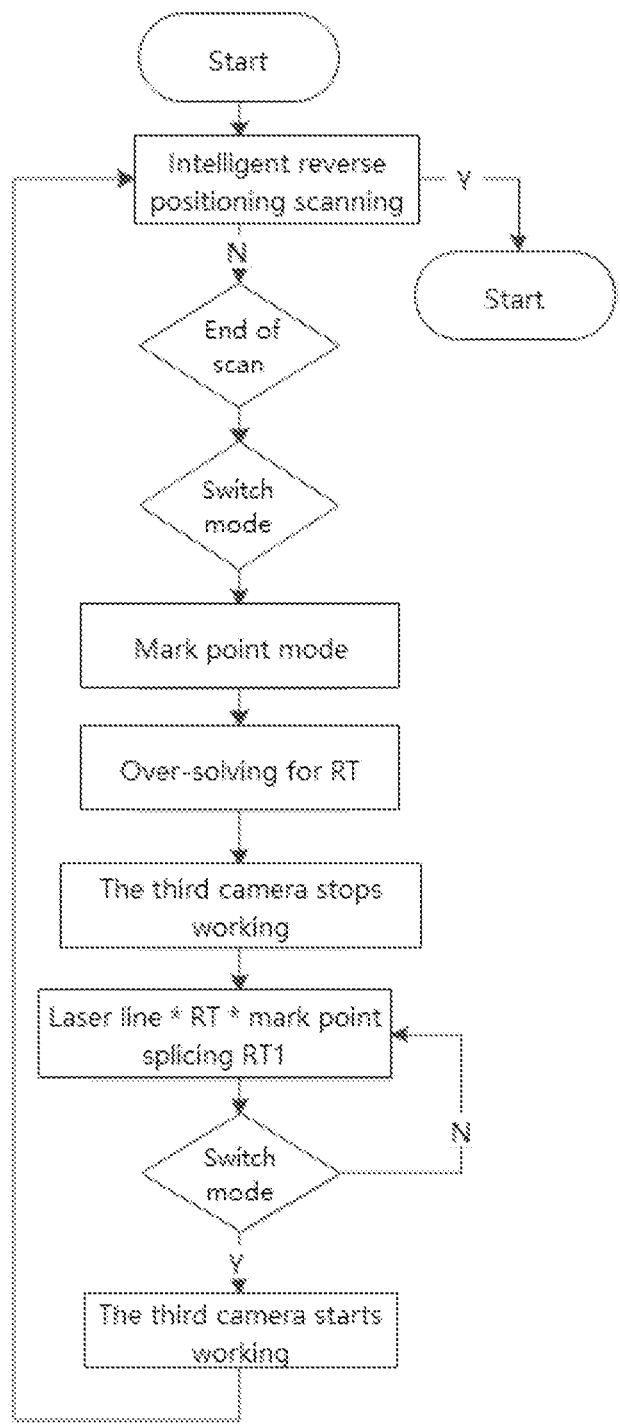
FIG. 5 is a flow chart of Embodiment I of the present disclosure.

The example takes the initial mode as the "intelligent reverse tracking mode" as an example, and as shown in the flow chart of FIG. 5, the detailed scanning mode conversion steps are as follows:

1. first setting the scanning as an "intelligent reverse tracking mode", and taking a "third camera coordinate system t1" at the moment as an initial coordinate system;

2. mode switch 1: after entering a "transition area", performing mode switching to switch to a "mark point mode";

3. then calculating the three-dimensional coordinate point which is converted into a "third camera coordinate system t1" from a "mark point coordinate system" has a rotation matrix of $R_{m\_t}$ and a translation vector of $T_{m\_t}$;

4. the third camera 2 (i.e., a reverse tracking device) stops working;

5. converting the three-dimensional coordinate of the laser line in the "mark point coordinate system" obtained under the mark point mode into a "third camera coordinate system t1";

6. mode switch 2: after exiting the "completely occluded area", entering a "transition area" again, and switching back to an "intelligent reverse tracking mode";

7. calculating the three-dimensional coordinate point which is converted into "a mark point coordinate system" from "a third camera coordinate system" has a transition rotation matrix of $R_{t\_m}$ and a translation vector of $T_{t\_m}$, wherein the purpose of solving $R_{t\_m}$ and $T_{t\_m}$ is for using in the step 8;

8. the reverse positioning of the third camera 2 starts operation again. Since the third camera 2 reversely starts working again, the "third camera coordinate system" at the moment is not the initial "third camera coordinate system t1" and is named as the "third camera coordinate system t2", conversion from the "third camera coordinate system t2" to the "third camera coordinate system t1" needs to be carried out; the conversion formula is as follows:

$$\begin{cases} P_{t1} = (R_{c\_t1}R_{c\_m}^{-1})P_m + (T_{c\_t1} - R_{c\_t1}R_{c\_m}^{-1}T_{c\_m}) \\ P_m = (R_{c\_m}R_{c\_t2}^{-1})P_{t2} + (T_{c\_m} - R_{c\_m}R_{c\_t2}^{-1}T_{c\_t2}) \end{cases} \Rightarrow P_{t1} =$$

$$(R_{c\_t1}R_{c\_m}^{-1})(R_{c\_m}R_{c\_t2}^{-1})P_{t2} +$$

$$(R_{c\_t1}R_{c\_m}^{-1})(T_{c\_m} - R_{c\_m}R_{c\_t2}^{-1}T_{c\_t2}) + (T_{c\_t1} - R_{c\_t1}R_{c\_m}^{-1}T_{c\_m})$$

$$R_{t2\_t1} = (R_{c\_t1}R_{c\_m}^{-1})(R_{c\_m}R_{c\_t2}^{-1})$$

let, $T_{t2\_t1} = (R_{c\_t1}R_{c\_m}^{-1})(T_{c\_m} - R_{c\_m}R_{c\_t2}^{-1}T_{c\_t2}) + (T_{c\_t1} - R_{c\_t1}R_{c\_m}^{-1}T_{c\_m})$, wherein: $R_{t2\_t1}$ is the rotation matrix of the "third camera coordinate system t2" to the "third camera coordinate system t1" and $T_{t2\_t1}$ is the translation vector of the "third camera coordinate system t2" to the "third camera coordinate system t1".

Converting the three-dimensional coordinate of the laser line into a "third camera coordinate system t1" according to $R_{t2\_t1}$ and $T_{t2\_t1}$, Example 2

Figure 6:
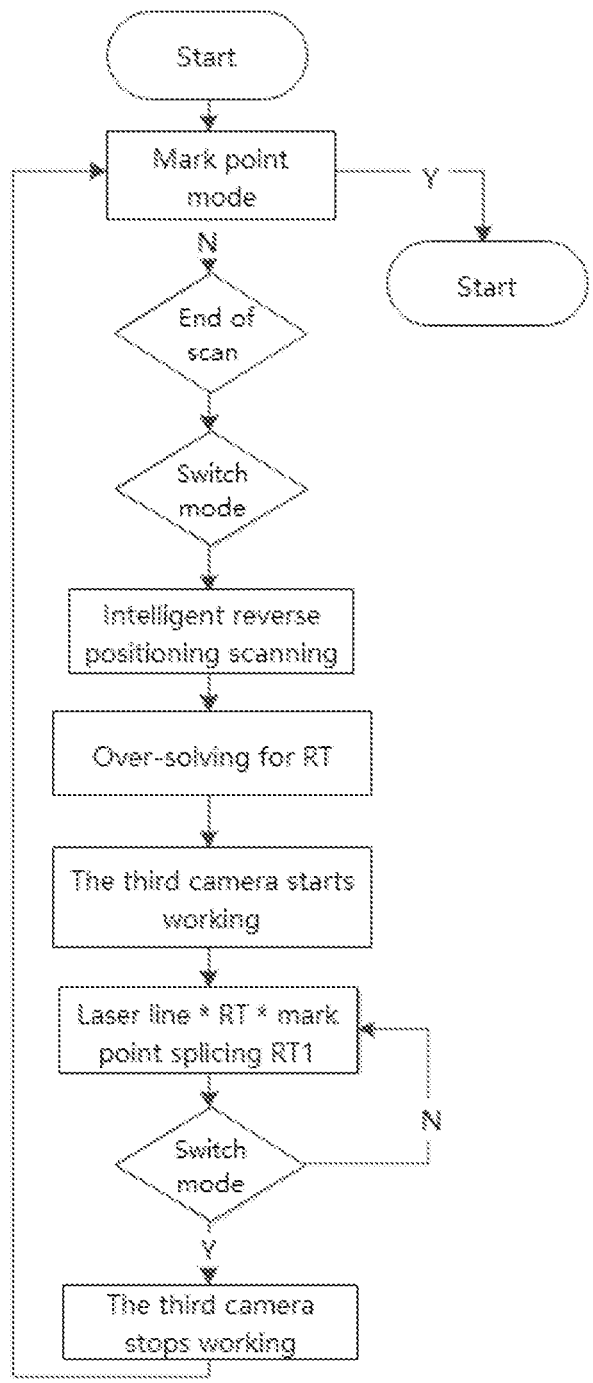
FIG. 6 is a flow chart of Embodiment II of the present disclosure.

In the embodiment, taking the initial mode of the "mark point mode" as an example, the initial mode is named as the "mark point coordinate system t2", and as shown in the flow chart of FIG. 6, the detailed scanning mode conversion step is as follows:

1. first setting the scanning as a "mark point mode", and taking a "mark point coordinate system t1" at the moment as an initial coordinate system;

2. mode switch 1: after entering a "transition area", performing mode switching to switch to an "intelligent reverse tracking mode";

3. then calculating the three-dimensional coordinate point which is converted into "a mark point coordinate system" from "a third camera coordinate system" has a rotation matrix of $R_{m\_t}$ and a translation vector of $T_{m\_t}$;

4. the third camera 2 reversely tracks, and the equipment starts to scan back and forth;

5. converting the three-dimensional coordinate of the laser line obtained in the "third camera coordinate system" under the intelligent reverse tracking mode into a "mark point coordinate system";

6. mode switch 2: after exiting the "completely occluded area", entering a "transition area" again, and switching back to a "mark point mode";

7. then calculating the three-dimensional coordinate point which is converted into "a third camera coordinate system" from "a mark point coordinate system" has a transition rotation matrix of $R_{t\_m}$ and a translation vector of $T_{t\_m}$, wherein the purpose of solving $R_{t\_m}$ and $T_{t\_m}$ is for using in the step 8;

8. the third camera 2 stops operating again in the reverse direction. At this time, the "mark point coordinate system" is not the initial "mark point coordinate system t1", and is named as "mark point coordinate system t2", so the transformation from the "mark point coordinate system t2" to the "mark point coordinate system t1" needs to be carried out; the conversion formula is as follows:

$$\begin{cases} P_{t1} = (R_{c\_t1}R_{c\_m}^{-1})P_m + (T_{c\_t1} - R_{c\_t1}R_{c\_m}^{-1}T_{c\_m}) \\ P_m = (R_{c\_m}R_{c\_t2}^{-1})P_{t2} + (T_{c\_m} - R_{c\_m}R_{c\_t2}^{-1}T_{c\_t2}) \end{cases} \Rightarrow P_{t1} =$$

$$(R_{c\_t1}R_{c\_m}^{-1})(R_{c\_m}R_{c\_t2}^{-1})P_{t2} +$$

$$(R_{c\_t1}R_{c\_m}^{-1})(T_{c\_m} - R_{c\_m}R_{c\_t2}^{-1}T_{c\_t2}) + (T_{c\_t1} - R_{c\_t1}R_{c\_m}^{-1}T_{c\_m})$$

$$R_{t2\_t1} = (R_{c\_t1}R_{c\_m}^{-1})(R_{c\_m}R_{c\_t2}^{-1})$$

let, $T_{t2\_t1} = (R_{c\_t1}R_{c\_m}^{-1})(T_{c\_m} - R_{c\_m}R_{c\_t2}^{-1}T_{c\_t2}) + (T_{c\_t1} - R_{c\_t1}R_{c\_m}^{-1}T_{c\_m})$, wherein: $R_{t2\_t1}$ is the rotation matrix of the "mark point coordinate system t2" to the "mark point coordinate system t1" and $T_{t2\_t1}$ is the translation vector of the "mark point coordinate system t2" to the "mark point coordinate system t1".

Converting the three-dimensional coordinate of the laser line to the coordinate system of the "mark point coordinate system t1" according to $R_{t2\_t1}$ and $T_{t2\_t1}$, means completing the operation of converting the intelligent reverse tracking mode back to the mark point mode.

The present disclosure is applicable to a three-dimensional scanner, which combines the characteristics of intelligent reverse tracking type scanning and mark point 6 tracking type three-dimensional scanning, the surface of an object can be scanned without pasting a mark point 6, the precision is higher than that of an optical tracking type three-dimensional scanner, a mixed mode of pasting a mark point 6 and not pasting a mark point 6 can be used, which is freely switched, multipurpose, high in speed and high in precision in scanning, is simple and convenient to use and high in automation degree.

While the foregoing is directed to the preferred examples of the disclosure, it is not intended to limit the disclosure to the precise form disclosed, any modification, equivalent replacement or improvement made within the spirit and principle of the present disclosure should be included in the protection scope of the present disclosure.

What is claimed is:

1. A positioning device combining mark point positioning and intelligent reverse positioning, comprising:
   a binocular camera;
   a third camera, wherein a visual field of the third camera is not completely overlapped with a visual field of the binocular camera; and
   a laser provided between a left camera and a right camera of the binocular camera, and the binocular camera, the third camera and the laser are respectively in signal connection with an upper computer;
   wherein:
      the laser is used for emitting laser projection, the binocular camera is used for acquiring images with laser lines and mark points on a surface of a scanned object, and the third camera is used for acquiring images with coding points and mark points in a peripheral environment; and
      the upper computer is used for calculating surface point cloud data of scanned object according to images acquired by the binocular camera and/or the third camera, wherein the positioning device comprises a mark point mode for mark point positioning and an intelligent reverse tracking mode for intelligent reverse positioning.

2. The positioning device combining mark point positioning and intelligent reverse positioning of claim 1, wherein the binocular camera and the third camera are provided with LEDs.

3. The positioning device combining mark point positioning and intelligent reverse positioning of claim 1, wherein based on the signal connection, the upper computer, the binocular camera, and the laser cooperate to perform a method comprising steps of:
   S1: calibrating parameters of each camera under different scanning modes, and enabling parameters of each camera to synchronously and correspondingly transform when scanning modes are switched; and
   S2: judging the scanning mode for the mark point mode or the intelligent reverse tacking mode through scanning scene and switching the scanning mode into the mark point mode or the intelligent reverse tracking mode.

4. The positioning device combining mark point positioning and intelligent reverse positioning of claim 3, wherein the step S2 of judging the scanning mode for the mark point mode comprises following steps of:
   acquiring an image with a laser line and a mark point through the binocular camera, extracting laser line coordinate information and mark point coordinate information in the image, calculating three-dimensional coordinates of the laser line through a space forward intersection algorithm and establishing a laser line point cloud, calculating three-dimensional coordinates of the mark point through a space forward intersection algorithm, and establishing a mark point set, establishing a mark point coordinate system through the laser line point cloud and the mark point set, matching the information of a current frame and the mark point sets of all previous frame images to obtain a conversion relationship between the current frame and the previous frame images, converting the current frame images into the mark point coordinate system through the conversion relationship in sequence, and splicing to obtain the surface point cloud data of the scanned object in the mark point coordinate system.

5. The positioning device combining mark point positioning and intelligent reverse positioning of claim 4, wherein the step S2 of switching the scanning mode into the intelligent reverse tracking mode comprises following steps of:
   acquiring a three-dimensional coordinate of the third camera in a left camera coordinate system, acquiring an image with a laser line through the binocular camera, extracting three-dimensional coordinate information of the laser line, and calculating the three-dimensional coordinate point of the laser line in the left camera coordinate system by adopting the space forward intersection algorithm; acquiring an image with a coding point and a mark point in a peripheral environment through the third camera, extracting coordinates of the mark point, and calculating coordinates of the mark point in a third camera coordinate system through a rear space intersection algorithm, calculating the conversion relation between the left camera coordinate system and the third camera coordinate system through the three-dimensional coordinates of the left camera in the third camera coordinate system and the coordinates of the mark points in the third camera coordinate system, converting laser line three-dimensional coordinate points of each frame of image from the left camera coordinate system to the third camera coordinate system through the conversion relation to complete splicing, and obtaining the surface point cloud of the scanned object in the third camera coordinate system.

6. The positioning device combining mark point positioning and intelligent reverse positioning of claim 5, wherein the step S2 of switching the scanning mode from the mark point mode to the intelligent reverse tracking mode comprises:
   in a transition area, calculating the conversion relation between a laser point cloud in the mark point coordinate system and the laser point cloud in the third camera coordinate system through a multi-frame data, and converting the laser point cloud in the mark point coordinate system into the third camera coordinate system through the conversion relation.

7. The positioning device combining mark point positioning and intelligent reverse positioning of claim 5, wherein the step S2 of switching the scanning mode from the intelligent reverse tracking mode to the mark point mode comprises:
   in the transition area, calculating the conversion relation between the laser point cloud in the third camera coordinate system and the laser point cloud in the mark point coordinate system through the multi-frame data, and converting the laser point cloud in the third camera coordinate system into the mark point coordinate system through the conversion relation.

8. The positioning device combining mark point positioning and intelligent reverse positioning of claim 7, wherein the transition area is an area where the third camera can recognize the coding point and the mark point in the peripheral environment.

9. The positioning device combining mark point positioning and intelligent reverse positioning of claim 8, wherein the conversion relationship needs to be recalculated if the relative positions of the third camera coordinate system and the mark point coordinate system change during scanning.

* * * * *